US009069658B2

(12) United States Patent
Borchers et al.

(10) Patent No.: US 9,069,658 B2
(45) Date of Patent: Jun. 30, 2015

(54) USING A VIRTUAL TO PHYSICAL MAP FOR DIRECT USER SPACE COMMUNICATION WITH A DATA STORAGE DEVICE

(71) Applicant: GOOGLE INC., Mountain View, CA (US)

(72) Inventors: Albert T. Borchers, Aptos, CA (US); Benjamin S. Gelb, San Francisco, CA (US); Thomas J. Norrie, Mountain View, CA (US); Andrew T. Swing, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 13/709,972

(22) Filed: Dec. 10, 2012

(65) Prior Publication Data

US 2014/0164676 A1 Jun. 12, 2014

(51) Int. Cl.
*G06F 12/08* (2006.01)
*G06F 3/038* (2013.01)
*G06F 19/00* (2011.01)
*G06F 12/02* (2006.01)
G06F 3/06 (2006.01)

(52) U.S. Cl.
CPC .......... *G06F 12/0246* (2013.01); *G06F 3/0611* (2013.01); *G06F 3/0631* (2013.01); *G06F 3/0688* (2013.01); *G06F 2212/7201* (2013.01); *G06F 3/0659* (2013.01)

(58) Field of Classification Search
CPC ... G06F 12/109; G06F 12/1009; G06F 12/06; G06F 2212/152; G06F 2212/7201; G06F 3/0659; G06F 12/08; G06F 2212/2022; G06F 12/10; G06F 2212/7208; G06F 3/0658; G06F 3/064; G06F 3/0665; G06F 12/00
See application file for complete search history.

(56) References Cited

U.S. PATENT DOCUMENTS

| 5,778,349 | A  | 7/1998 | Okonogi |
| 8,205,037 | B2 | 6/2012 | Swing et al. |
| 8,239,713 | B2 | 8/2012 | Borchers et al. |
| 8,239,724 | B2 | 8/2012 | Swing et al. |
| 8,239,729 | B2 | 8/2012 | Borchers et al. |
| 8,244,962 | B2 | 8/2012 | Swing et al. |
| 8,250,271 | B2 | 8/2012 | Swing et al. |

(Continued)

OTHER PUBLICATIONS

International Search Report and Written Opinion for PCT Application No. PCT/US2013/073873, mailed on Apr. 10, 2014, 11 pages.

*Primary Examiner* — Matthew Bradley
*Assistant Examiner* — Candice Rankin
(74) *Attorney, Agent, or Firm* — Brake Hughes Bellermann LLP

(57) ABSTRACT

A data storage device includes multiple flash memory devices, where each of the flash memory devices are arranged into multiple blocks having multiple pages for storing data. The data storage device includes a memory controller that is operationally coupled with the flash memory devices. The memory controller is configured to receive a virtual to physical memory address translation map from a host device, where a physical memory address includes a physical address for memory on the host device. The memory controller is configured to store the virtual to physical memory address translation map in a memory module on the memory controller, receive commands directly from an application running on the host device, where the commands include virtual memory addresses that refer to the memory on the host device and translate the virtual memory addresses to physical memory addresses using the virtual to physical memory address translation map.

20 Claims, 4 Drawing Sheets

(56) References Cited

U.S. PATENT DOCUMENTS

| | | |
|---|---|---|
| 8,250,283 B1 | 8/2012 | Lee et al. |
| 8,255,618 B1 | 8/2012 | Borchers et al. |
| 8,321,627 B1 | 11/2012 | Norrie et al. |
| 8,327,220 B2 | 12/2012 | Borchers et al. |
| 2004/0111580 A1 | 6/2004 | Weber et al. |
| 2006/0133396 A1* | 6/2006 | Shah et al. .................... 370/412 |
| 2007/0214340 A1* | 9/2007 | Leveille et al. ............... 711/203 |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262759 A1 | 10/2010 | Swing et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0269015 A1 | 10/2010 | Borchers et al. |
| 2010/0287217 A1* | 11/2010 | Borchers et al. .............. 707/813 |
| 2010/0332727 A1* | 12/2010 | Kapil et al. ................... 711/103 |
| 2011/0179414 A1 | 7/2011 | Goggin et al. |
| 2012/0030416 A1 | 2/2012 | Borchers et al. |
| 2012/0030507 A1 | 2/2012 | Borchers et al. |
| 2012/0030542 A1 | 2/2012 | Borchers et al. |

* cited by examiner

USING A VIRTUAL TO PHYSICAL MAP FOR DIRECT USER SPACE COMMUNICATION WITH A DATA STORAGE DEVICE

TECHNICAL FIELD

This description relates to using a virtual to physical map for direct user space communication with a data storage device.

SUMMARY

In one general aspect, a data storage device includes multiple flash memory devices, where each of the flash memory devices are arranged into multiple blocks having multiple pages for storing data. The data storage device includes a memory controller that is operationally coupled with the flash memory devices. The memory controller is configured to receive a virtual to physical memory address translation map from a host device, where a physical memory address includes a physical address for memory on the host device. The memory controller is configured to store the virtual to physical memory address translation map in a memory module on the memory controller, receive commands directly from an application running on the host device, where the commands include virtual memory addresses that refer to the memory on the host device and translate the virtual memory addresses to physical memory addresses using the virtual to physical memory address translation map.

Implementations may include one or more of the following features. For example, the memory controller may be configured to receive commands directly from the application running on the host device through one of multiple queues. The virtual to physical memory address translation map may be shared among the multiple queues. The commands may include virtual memory addresses with an offset. The memory controller may be configured to receive multiple virtual to physical memory address translation maps from the host device, where each of the virtual to physical memory address translation maps corresponds to one of the multiple queues and the commands include virtual memory addresses with an offset. The memory controller may be configured to receive multiple virtual to physical memory address translation maps from the host device, where the virtual to physical memory address translation maps are shared among the multiple queues and the commands include virtual memory addresses with an offset. The memory module on the memory controller may include a dynamic random access memory (DRAM) and the memory controller may include a memory address translator, where the memory address translator is configured to translate the virtual memory addresses to physical memory addresses using the virtual to physical memory address translation map stored in the DRAM.

In another general aspect, a method includes receiving, at a memory controller, a virtual to physical memory address translation map from a host device, where a physical memory address includes a physical address for memory on the host device. The method includes storing the virtual to physical memory address translation map in a memory module on the memory controller, receiving commands directly from an application running on the host device, where the commands include virtual memory addresses that refer to the memory on the host device and translating the virtual memory addresses to physical memory addresses using the virtual to physical memory address translation map.

Implementations may include one or more of the following features. For example, receiving the commands may include receiving the commands directly from the application running on the host device through one of multiple queues. The method may include sharing the virtual to physical memory address translation map among the multiple queues. The commands may include virtual memory addresses with an offset. Receiving the virtual to physical memory address translation map from a host device may include receiving multiple virtual to physical memory address translation maps from the host device, where each of the virtual to physical memory address translation maps may correspond to one of the multiple queues and the commands may include virtual memory addresses with an offset. Receiving the virtual to physical memory address translation map from a host device may include receiving multiple virtual to physical memory address translation maps from the host device, the virtual to physical memory address translation maps may be shared among the multiple queues and the commands may include virtual memory addresses with an offset.

In another general aspect, a system includes a host device configured to generate a virtual to physical memory address translation map. The host device includes memory and at least one application running on the host. The system includes a data storage device operationally coupled with the host device. The data storage device includes multiple flash memory devices, where each of the flash memory devices are arranged into multiple blocks having multiple pages for storing data. The data storage device includes a memory controller operationally coupled with the flash memory devices. The memory controller is configured to receive the virtual to physical memory address translation map from the host device, where a physical memory address includes a physical address for the memory on the host device, store the virtual to physical memory address translation map in a memory module on the memory controller, receive commands directly from the at least one application running on the host device, where the commands include virtual memory addresses that refer to the memory on the host device, and translate the virtual memory addresses to physical memory addresses using the virtual to physical memory address translation map.

Implementations may include one or more of the following features. For example, the host device may include a plurality of queues and the memory controller may be configured to receive commands directly from the application running on the host device through one of the plurality of queues. The virtual to physical memory address translation map may be shared among the plurality of queues. The commands may include virtual memory addresses with an offset. The host device may be configured to generate multiple virtual to physical memory address translation maps and the memory controller may be configured to receive the multiple virtual to physical memory address translation maps from the host device, where each of the virtual to physical memory address translation maps corresponds to one of the multiple queues and the commands include virtual memory addresses with an offset. The host device may be configured to generate multiple virtual to physical memory address translation maps and the memory controller may be configured to receive the multiple virtual to physical memory address translation maps from the host device, where the virtual to physical memory address translation maps are shared among the multiple queues and the commands include virtual memory addresses with an offset. The memory module on the memory controller may include a dynamic random access memory (DRAM) and the memory controller may include a memory address translator, where the memory address translator is configured to translate the virtual memory addresses to physical memory addresses using the virtual to physical memory address translation map stored in the DRAM.

The details of one or more implementations are set forth in the accompanying drawings and the description below. Other features will be apparent from the description and drawings, and from the claims.

DETAILED DESCRIPTION

This document describes systems and techniques to enable direct user space communication by an application running on a host device with a data storage device. The data storage device may include multiple memory devices. The application running on the host device may use virtual memory addresses in commands to the data storage device, where the virtual memory addresses refer to host memory that may be allocated for the application. The host device may generate a virtual to physical memory address translation map and communicate the map to the data storage device for storage and use on the data storage device. In this manner, the application running on the host device may send commands directly to the data storage device and bypass driver/kernel space on the host device. A memory controller on the data storage device may translate the virtual memory addresses used in the commands to the physical memory addresses using the map stored on the data storage device, where the physical memory addresses refer to the actual physical address of the host memory. By enabling the user space application to communicate directly with the data storage device, the central processing unit (CPU) processing overhead on the host device may be reduced and latency in communication between the application and the data storage device may be reduced.

In one example implementation, the host device may include multiple queues. An application running on the host device may use one or more of the queues to communicate commands directly to the data storage device. The virtual to physical address translation map may be shared by the queues. Additionally or alternatively, the host may generate multiple virtual to physical address translation maps that are communicated and stored on the data storage device and each of the queues may use one of the maps.

Figure 1:
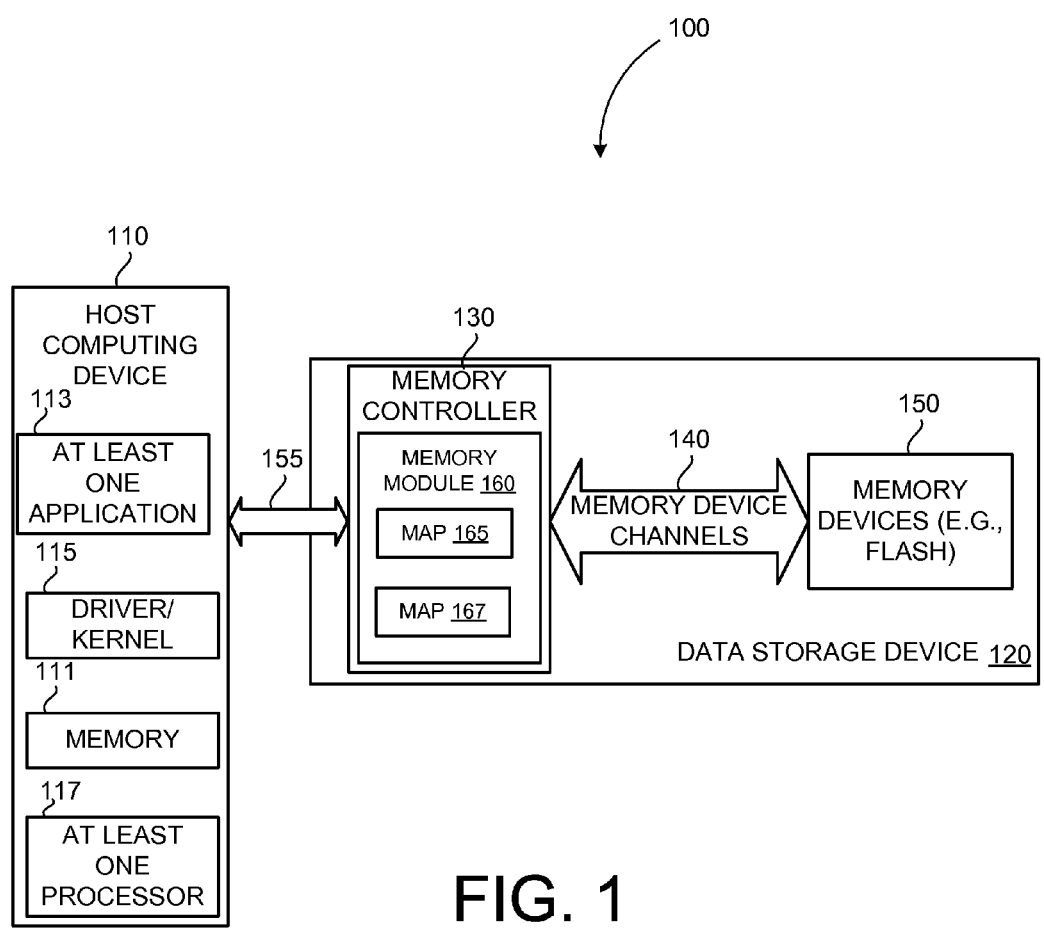
FIG. 1 is a block diagram illustrating a computing system in accordance with an example implementation.

FIG. 1 is a block diagram illustrating a computing system 100 in accordance with an example implementation. The computing system 100 includes a host computing device 110 and a data storage device 120. The host computing device 110 and the data storage device 120 may be implemented using the techniques described herein. The host 110, in this example may be an electronic device that is operably coupled with the data storage device 120, and may issue various types of commands and/or requests to the data storage device. The host 110 may take a number of forms. As some examples, the host 110 may be implemented as a personal computer, a laptop computer, a server, a tablet computer or a netbook computer. In other implementations, the host 110 may take other forms as well. The data storage device 120 also may take a number of forms. The data storage device 120 may be implemented as a number of appropriate devices that may work in conjunction with a host device (e.g., the host device 110) to store and/or retrieve electronic data. For instance, the data storage device may be a solid state drive (SSD) (e.g., a flash memory based SSD), a magnetic disk drive or an optical disk drive, as some examples.

As shown in FIG. 1, the host 110 includes memory 111, at least one processor 117, at least one application 113 running on the host 110, and a driver/kernel 115. The memory 111 may be any type of memory. The memory 111 may be used to store instructions that are executed by the at least one processor 117 and/or allocated for use by the at least one application 113. The application 113 may include a user space application. The application 113 may be any type of application. For example, the application 113 may request data from the data storage device 120, where the requested data would be read into the memory 111. Similarly, the application 113 may send data from the memory 111 to be written to the data storage device 120. The processor 117 may be any type of processor that executes instructions, which may be stored in memory 111, to perform various actions. The driver/kernel 115 may be a component of the operating system that functions to manage the processing, memory and input/output resources of the host computing device 110. The driver/kernel 115 may function to manage resources between the application 113 and the hardware elements such as the memory 111 and the processor 117. One or more drivers may be implemented as part of the driver/kernel 115.

As shown in FIG. 1, the data storage device 120 includes a memory controller 130, memory device channel interfaces 140 (also referred to as memory device channels) and memory devices 150. The memory devices 150 may be implemented using a number of different types of memory devices. For instance, the memory devices 150 may be implemented using flash memory devices (e.g., NAND flash memory devices), or other types of non-volatile memory devices. In certain implementations, volatile memory devices, such as random access memory devices, may be used. For purposes of this disclosure, the various implementations described herein will be principally discussed as being implemented using flash memory devices. It will be appreciated, however, that other approaches are possible and other types of memory devices may be used to implement the implementations described herein.

In the computing system 100, as well as in other implementations described herein, the memory controller 130 may obtain memory operation commands from the host computing device 110. When implementing the data storage device 120 using flash memory devices for the memory devices 150, the memory operation commands obtained by the memory controller 130 from the host computing device 110 may include flash memory read commands, flash memory write commands and flash memory erase commands, as well as other types of flash memory commands (e.g., move commands and/or copy commands). For purposes of this disclosure, the terms memory operation command, memory operation and memory command may be used interchangeably to describe machine-readable instructions (e.g., from a host computing device to a data storage device) to execute one or more data storage functions in a data storage device.

In the computing system 100, the memory devices 150 may include a plurality of memory devices, such as flash memory devices, that are organized into a plurality of memory channels. In such an approach, each of the memory channels may include one or more individual memory devices. Depending on the particular implementation, the individual memory devices of a given memory channel may be implemented in individual device packages, or alternatively, multiple memory devices of a given memory channel may be included in a single device package.

For instance, in an example implementation, the data storage device 120 may include multiple memory channels. In such an approach, the memory controller 130 may communicate with the memory devices 150 of each memory channel using a separate memory device channel interface 140. Each memory device channel interface 140 may include a respective channel controller that is configured to facilitate communication between the memory devices 150 of the respective memory channel and the memory controller 130. For example, such channel controllers may be configured to manage a shared bus between the memory controller 130 and the memory devices 150 of a given memory channel, including communicating memory operation commands, chip select information, as well as managing communication of other data and control information between the memory controller 130 and the memory devices 150 over a corresponding memory device channel interface 140.

In one exemplary implementation, the memory controller 130 and other components may be disposed on a printed circuit board and the memory devices 150 may be disposed on one or more other printed circuit boards. The printed circuit boards may be assembled together.

In one exemplary implementation, a high speed link 155 may be used to connect the host computing device 110 and the data storage device 120. The link 155 may be a physical connection or it may be a logical connection. For instance, the link 155 may be a PCI-e link to connect and route signals between the host computing device 110 and the data storage device 120.

In one example implementation, the memory controller 130 may obtain memory operation commands directly from the at least one application 113 running on the host 110. In this manner, the application 113 may bypass the driver/kernel 115 on the host 110 and communicate the commands directly to the memory controller 130 on the data storage device 120. To enable the application 113 to communicate directly with the memory controller, the memory controller 103 may include a memory module 160. In one example implementation, the memory module 160 may be a dynamic random access memory (DRAM). In other example implementations, the memory module 160 may include other types of memory.

The host 110 may generate a virtual to physical memory address translation map, which may be referred to as a map or a table throughout this document. The virtual memory addresses may be in the space of the application 113 and the host 110 maps these virtual memory addresses to physical memory addresses for the memory 111 on the host 110. Specifically, the application 113 may select a range of its virtual memory assigned to the application by the host 110 where its input-output (IO) buffers will reside. The application 113 may pass this address range to the driver/kernel 115 on the host 110. The driver/kernel 115 on the host 110 may mark the memory locations so the allocated memory does not get moved or changed and may build the map for that memory range and the host 110 may communicate the map to the data storage device 120.

The data storage device 120 may receive the map 165 from the host 110 and may store the map 165 in the memory module 160. The memory controller 130 may receive commands directly from the application 113, where the received commands include virtual memory addresses. The memory controller 130 may translate the virtual memory addresses to physical memory addresses using the map 165. In this manner, data relating to the commands received directly from the application 113 may be stored in or retrieved from the appropriate physical memory location in the memory 111 on the host 110, as the case may be. By performing the virtual address to physical address translation in the memory controller 130 on the data storage device 120, the driver/kernel 115 on the host may be bypassed in that the driver/kernel 115 and the processor 117 do not have to use processing power to perform any of the translations to map the virtual address to the physical memory addresses for the memory 111.

The host 110 may communicate the map 165 to the data storage device 120 using a write command that writes the map 165 to the memory module 160. The write command may specify where in the memory module 160 to store the map 165. Updates to the map may be performed by the memory controller 130. The host 110 may read the map 165 from the memory module 160 back to the host 110 to be stored, for instance, in the memory 111. In this manner, the host 110 may control the generation of the map 165 and the communication of the map 165 between the host 110 and the memory controller 130.

The host 110 also may generate a logical address to physical address translation map, which may be referred to as a map or a table throughout this document. The logical address and the physical addresses refer to addresses of the memory devices 150 on the data storage device 120. The logical addresses may be used, for example, by the application 113 on the host 110 when sending commands to the data storage device that refer to data on the memory devices 150. The logical addresses need to be translated to the actual physical address (e.g., a specific page in a block of memory on a memory device 150) to perform actions on the correct data referred to in the commands by the logical addresses. The host 110 generates the logical address to physical address translation map and communicates the map 167 to the memory controller 130 on the data storage device 120.

In one implementation, the host 110 may generate a logical address to physical address translation map for each of the memory devices 150 on the data storage device 120. In this manner, each memory device on the data storage device has its own respective translation map. The host 110 may communicate each of the maps to the memory controller 130.

The memory controller 130 receives the map 167 from the host 110 and may store the map 167 in the memory module 160. In the case of multiple maps, where there is one map for each memory device, the memory controller 130 stores the multiple maps in the memory module 160. The memory controller 130 may receive commands directly from the application 113, where the received commands may use logical memory addresses when referring to the memory modules 150. The memory controller 130 translates the logical addresses to physical addresses using the map 167, where the physical addresses refer to actual physical locations on the memory modules 150. In this manner, data relating to the commands received directly from the application 113 may be stored in or retrieved from the appropriate physical memory location in the memory devices 150 on the data storage device 120. By performing the logical address to physical address translation in the memory controller 130 on the data storage device 120, the processor 117 on the host 110 may be bypassed in that the processor 117 does not have to use processing power to perform any of the translations to map the logical addresses to the physical addresses for the memory modules 150.

The host 110 may communicate the map 167 to the data storage device 120 using a write command that writes the map 167 to the memory module 160. The write command may specify where in the memory module 160 to store the map 167. Updates to the map may be performed by the memory controller 130. The host 110 may read the map 167 from the memory module 160 back to the host 110 to be stored, for instance, in the memory 111. In this manner, the host 110 may control the generation of the map 167 and the communication of the map 167 between the host 110 and the memory controller 130.

Figure 2:
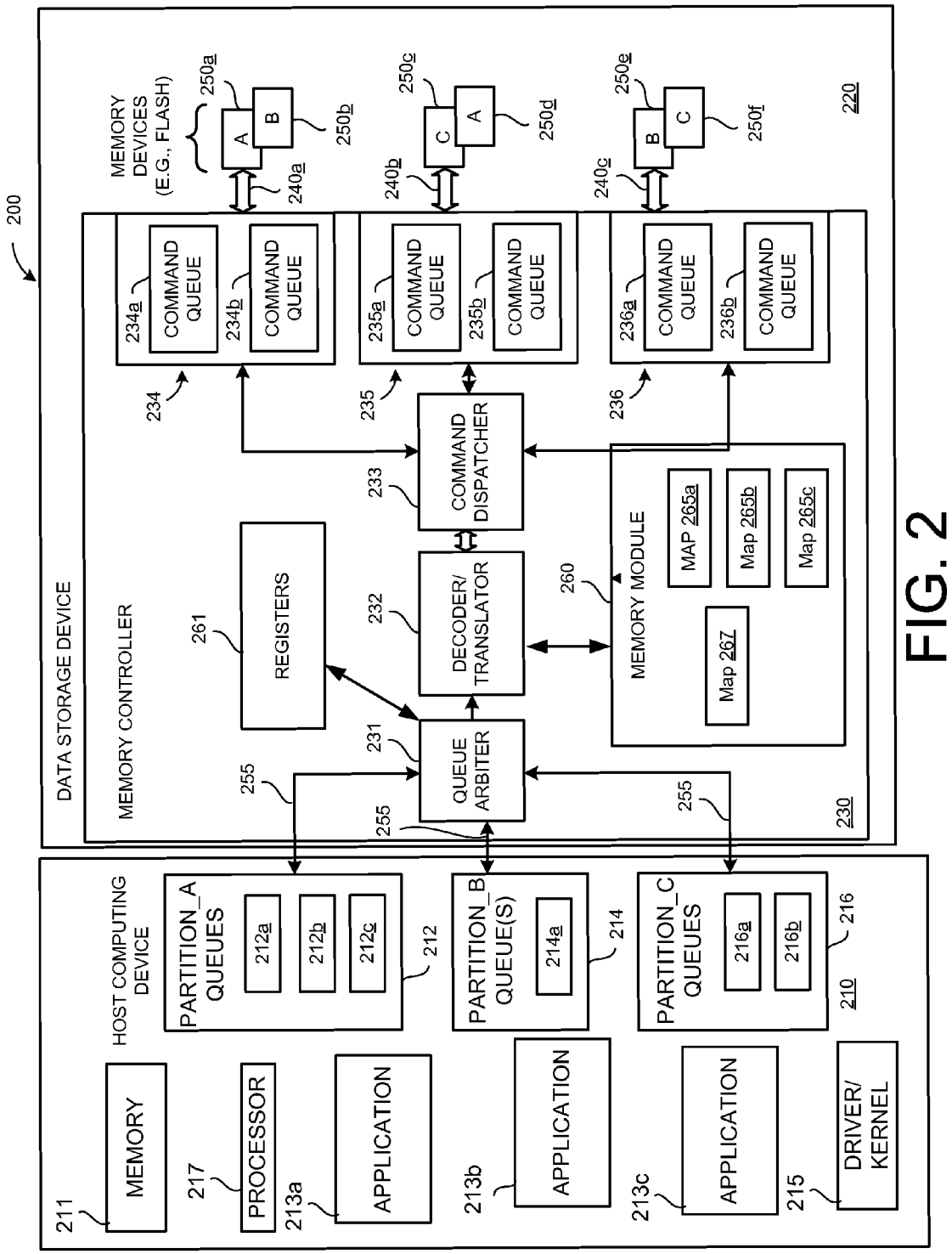
FIG. 2 is a block diagram illustrating another computing system in accordance with an example implementation.

FIG. 2 is a block diagram illustrating a computing system 200 in accordance with an example implementation. The computing system 200 shown in FIG. 2 includes similar elements to the computing system 100 shown in FIG. 1. Like elements of the computing system 200 to those of the computing system 100 are referenced with 200 series reference numerals that correspond with the 100 series reference numerals shown in FIG. 1. For instance, the computing system 200 includes a host computing device 210 and a data storage device 220. The data storage device 220 includes a memory controller 230, memory device communication channels 240 (240a-240c), memory devices 250 (250a-250f). A link 255 connects and routes signals between the host computing device 210 and the data storage device 220. The link 255 may be a physical connection or a logical connection. The memory controller 230 includes a memory module 260, which may store multiple maps 265a-265c and map 267. In this example, the host computing device 210 includes memory 211, multiple applications 213a-213c, driver/kernel 215 and processor 217.

The various elements of the computing system 200 shown in FIG. 2 (as well as the other implementations described herein) are provided by way of illustration. The computing system 200 (and the other implementations described herein) may include other elements or aspects. For instance, the computing system 200, may include data path elements configured to communicate data between the host device 210 and the memory controller 230 and/or the memory devices 250a-250f. Such data path components may include, for example, one or more bus interfaces and/or a direct memory access (DMA) controller, as well as a number of other possible components. The registers 261 may assist in enabling a direct path communication between the applications 213a-213c and the memory controller 230 and/or the memory devices 250a-250f. Further, the computing system 200 may also include additional control path elements other than those shown in FIG. 2. It will be appreciated that the particular components and/or aspects of the computing system 200, as well as the other implementations described herein, will depend, at least in part, on the particular implementation.

In the computing system 200, the host computing device 210, the memory controller 230, the memory device channels 240 and the memory devices 250 may be configured to implement a plurality of memory partitions. In the implementation shown in FIG. 2, three memory partitions are implemented, PARTITION_A, PARTITION_B and PARTITION_C. In other implementations, additional or fewer partitions may be implemented.

As shown in FIG. 2 the host computing device 210 includes one or more queues (which may be referred to as host memory operation queues or partition queues or partitions) that are associated with each memory partition implemented in the computing system 200. For example, the host computing device 210 includes PARTITION_A Queues 212, PARTITION_B Queues 214 and PARTITION_C Queues 216. In the host computing device 210, the PARTITION_A Queues 212 includes a queue 212a, a queue 212b and a queue 212c; the PARTITION_B Queues 214 includes only a single queue 214a; and the PARTITION_C Queues 216 includes a queue 216a and a queue 216b. In other implementations, additional or fewer queues may be used for each memory partition. In the computing system 200, the memory partition queues 212-216 may be used to queue memory operation commands generated by the host computing device 210 that are waiting to be communicated to the memory controller 230 for execution by the memory devices 250.

In the computing system 200, the applications 213a-213c on the host computing device 210 may be associated with one of the partition queues (i.e., PARTITION_A Queues 212, PARTITION_B Queues 214 and PARTITION_C Queues 216). The registers 261 may be configured into pages of registers such that there is a separate page for each of the partition queues. The partition queues 212-216 in cooperation with the registers 261 may enable a direct communication path between the applications 213a-213c and the data storage device 220.

In one example implementation, the individual queues within a particular memory partition may be used for different types of memory operation commands. For example, one individual queue within a memory partition may be used for read memory operation commands and another individual queue within the same memory partition may be used for write memory operation commands. For example, PARTITION_C 216 includes two individual queues, 216a and 216b. Queue 216a may be used for read memory operation commands and queue 216b may be used for write memory operation commands associated with the application 213c. For partitions having a plurality of individual queues within the same memory partition, those individual queues may be used for other types of commands in addition to read memory operation commands and write memory operation commands.

As shown in FIG. 2, the memory controller 230 of the computing system 200 includes a queue arbiter 231, a decoder/translator 232, a command dispatcher 233, command queue groups 234, 235 and 236, memory device channel interfaces 240a-240c and flash memory devices 250a-250f. As shown in FIG. 2, each memory device 250a-250f is associated with one of the three memory partitions of the computing system 200 (A, B or C, as indicated in FIG. 2). The particular arrangement shown in FIG. 2 is given by way of example and other arrangements are possible. For instance, the distribution of the memory devices across the memory partitions may be weighted. For example, four of the memory devices 250a-250f could be assigned to PARTITION_A, while only a single one of the memory devices 250a-250f may be respectively assigned to each of PARTITION_B and PARTITION_C. Of course, the computing system 200 may include additional or fewer memory devices and may also implement additional or fewer memory partitions, where the memory partitions may then be implemented in a number of different arrangements, such as using the techniques described herein.

As indicated above, in the computing system 200, the queue arbiter 231 of the memory controller 230 may be configured to obtain, from the host device 210, memory operation commands for execution by the memory devices in a number of fashions. For example, in one implementation, the queue arbiter 231 may be configured to obtain the memory operation commands from the host device in accordance with a partition work schedule for a plurality of memory partitions implemented in the data storage device, such as using the techniques described herein. In one implementation, such a partition work schedule may be based on availability of allocated memory operation command slots for each respective memory partition.

As discussed above with respect to FIG. 1, the host 210 may generate both a virtual to physical memory address translation map 265a-265c, which relate to the memory addresses for the memory 211 on the host 210, and a logical to physical address translation map 267, which relates to the memory addresses for the memory devices 250a-250f on the data storage device 220. The host 210 may communicate the maps 265a-265c and 267 to the memory controller 230 for storage in the memory module 260. While the logical to physical address translation map 267 is illustrated in FIG. 2 as a single block, the map 267 may include multiple maps, where there is a single logical address to physical address translation map for each of the memory devices 250a-250f.

In one example implementation, the applications 213a-213c on the host 210 may share one of the virtual to physical memory address translation maps 265a, 265b or 265c. In this manner, the partition queues 212-216 (or queues) for each respective application 213a-213c may share a single map stored on the memory controller 230, where the virtual to physical address translation occurs. Specifically, the driver/kernel 215 on the host 210 may generate a virtual to physical memory address translation map for the applications 213a-213c and their respective partition queues 212-216 and communicate the map to the memory module 260 for storage on the memory module 260. When commands are received directly from one of the applications 213a-213c through its respective partition queue 212-216, the decoder/translator 232 may translate the virtual memory address specified in the command to a physical memory address using the shared map 265a, 265b, or 265c, where the physical memory address specifies a location in the memory 211 on the host 210.

In a shared map context, the application sending the command may use an offset applied to the virtual memory address. The offsets may be computed by the application and the decoder/translator 232 may apply the offset to look up the physical memory address in the map.

In another example implementation, each of the applications 213a-213c and their respective partition queues 212-216 on the host 210 may each have a corresponding virtual to physical address memory address translation map 265a-265c. The driver/kernel 215 on the host 210 may generate a virtual to physical memory address translation map for each of the applications 213a-213c and communicate the maps to the memory module 260 for storage on the memory module 260. When commands are received directly from one of the applications 213a-213c through its respective partition queue 212-216, the decoder/translator 232 may translate the virtual memory address specified in the command to a physical memory address using the respective map 265a-265c that was generated for the specific application.

The command dispatcher 233 of the computing system 200 may be operationally coupled with the queue arbiter 231 (e.g., via the decoder/translator 232 or directly), where the command dispatcher 233 is configured to receive the memory operation commands from the queue arbiter 231 (or sets of sub-commands for those memory operations commands) in a same order as obtained by the queue arbiter 231 from the host device 210. The command dispatcher 233 may be further configured to separately and respectively queue the memory operation commands for each of a plurality of memory devices 250.

In the computing system 200, the command dispatcher 233 may be further configured to dispatch the memory commands to their respective command queues 234-236 determined by the decoder/translator 232, such as based on a logical memory address. In the computing system 200, the command dispatcher 233 may be configured to dispatch respective memory operations for a given memory device 250 based on availability of queue slots in a respective command queue of the command queues 234-236.

Figure 3:
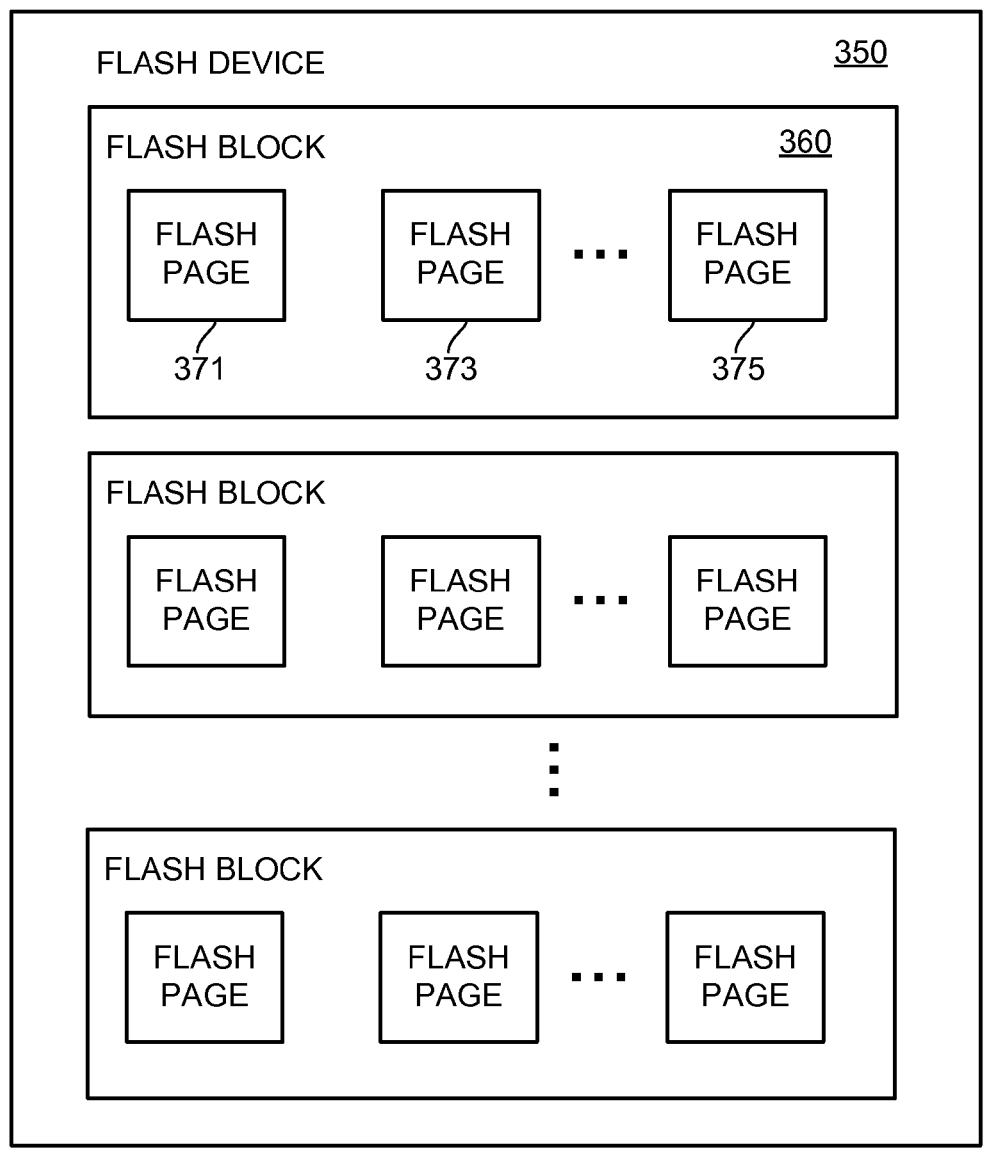
FIG. 3 is a block diagram illustrating an example flash memory device in accordance with an example implementation.

Referring also to FIG. 3, a block diagram illustrates a flash memory device 350 that may be used in the computing systems of FIGS. 1 and 2 in accordance with example implementations. For instance, the flash memory device 350 may be used to implement the memory devices 150 of the computing system 100 shown in FIG. 1 and/or the flash memory devices 250 of the computing system 200 shown in FIG. 2. As illustrated in FIG. 3, the flash memory device 350 includes a plurality of flash memory blocks, such as the flash memory block 360. While only three flash memory blocks are shown in the flash memory device 350, as is indicated in FIG. 3, the flash memory device 350 may include additional flash memory blocks. As is also shown in FIG. 3, each flash memory block of the flash memory device 350 may include a plurality of flash memory pages, such as the flash memory pages 371, 373 and 375. As with the flash memory blocks of the flash memory device 350, while only three flash memory pages are shown for each flash memory block of the flash memory device 350, as indicated in FIG. 3, each flash memory block may include additional flash memory pages.

The map 167 of FIG. 1 and map 267 of FIG. 2 may be used to translate the logical addresses used in commands from the host to physical addresses that specify a specific location for a page or pages on the flash devices, such as, flash device 350 illustrated in FIG. 3.

Figure 4:
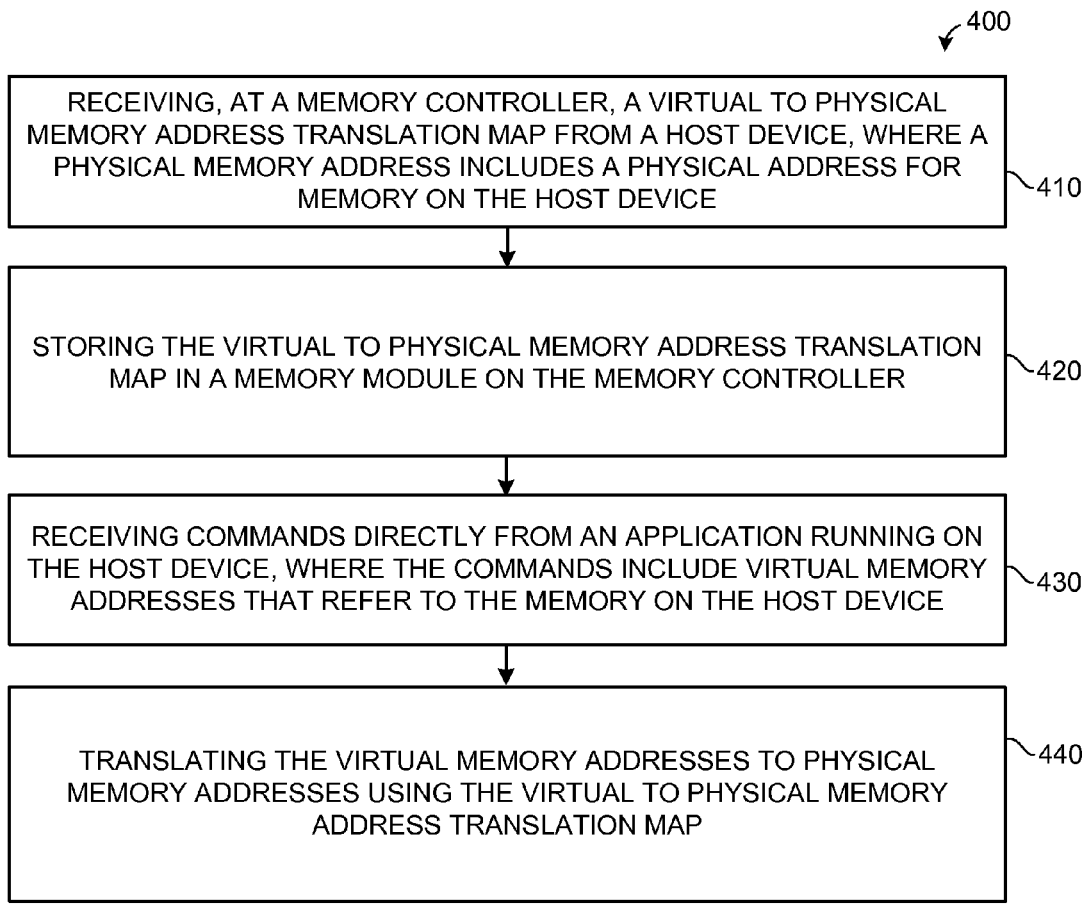
FIG. 4 is an exemplary flow diagram illustrating an exemplary process for direct user space communication with a data storage device.

Referring to FIG. 4, an exemplary flowchart illustrates and exemplary process 400 using the systems and components described above with respect to FIGS. 1-3. Process 400 includes receiving, at a memory controller, a virtual to physical memory address translation map from a host device, where a physical memory address includes a physical address for memory on the host device (410). For example, memory controller 130 may receive a virtual to physical memory address translation map 165 from a host device 110. The physical memory address may include a physical address in the memory 111 on the host 110. The map 165 may be generated by the host 110 and passed to the memory controller 130.

Process 400 includes storing the virtual to physical memory address translation map in a memory module on the memory controller (420). For example, the memory module 160 may store the map 165. In one example implementation, the memory module 160 may include a DRAM.

Process 400 includes receiving commands directly from an application running on the host device, where the commands include virtual memory addresses that refer to the memory on the host device (430). For example, the memory controller 130 may receive commands directly from an application 113 on the host 110, where the commands generated and sent by the application 113 include virtual memory addresses that refer to the memory 111 on the host device 110. The application 113 may send the commands directly to the data storage device 120 without going through a driver/kernel on the host 110.

Process 400 includes translating the virtual memory addresses to physical memory addresses using the virtual to physical address memory translation map (440). For example, the decoder/translator 232 may translate the virtual memory addresses to physical memory addresses using the virtual to physical address memory translation map 165. In some implementations, the host 110 may include multiple applications and multiple queues that correspond to the applications. The applications and their respective queues may share one of the maps and/or may each have their own respective maps.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations.

What is claimed is:

1. A data storage device, comprising:
a plurality of flash memory devices, each of the flash memory devices being arranged into a plurality of blocks having a plurality of pages for storing data; and
a memory controller operationally coupled with the flash memory devices, the memory controller being configured to:
receive a virtual to physical memory address translation map from a host device, wherein a physical memory address includes a physical address for memory on the host device;
store the virtual to physical memory address translation map in a memory module on the memory controller;
receive commands directly from an application running on the host device such that the commands bypass a driver and a kernel on the host device, wherein the commands include virtual memory addresses that refer to the memory on the host device; and
translate the virtual memory addresses to physical memory addresses using the virtual to physical memory address translation map.

2. The data storage device of claim 1 wherein the memory controller is configured to receive commands directly from the application running on the host device through one of a plurality of queues.

3. The data storage device of claim 2 wherein the virtual to physical memory address translation map is shared among the plurality of queues.

4. The data storage device of claim 3 wherein the commands include virtual memory addresses with an offset.

5. The data storage device of claim 2 wherein the memory controller is configured to receive a plurality of virtual to physical memory address translation maps from the host device, wherein each of the virtual to physical memory address translation maps corresponds to one of the plurality of queues and the commands include virtual memory addresses with an offset.

6. The data storage device of claim 2 wherein the memory controller is configured to receive a plurality of virtual to physical memory address translation maps from the host device, wherein the virtual to physical memory address translation maps are shared among the plurality of queues and the commands include virtual memory addresses with an offset.

7. The data storage device of claim 1 wherein the memory module on the memory controller includes a dynamic random access memory (DRAM) and the memory controller includes a memory address translator, wherein the memory address translator is configured to translate the virtual memory addresses to physical memory addresses using the virtual to physical memory address translation map stored in the DRAM.

8. A method comprising:
receiving, at a memory controller, a virtual to physical memory address translation map from a host device, wherein a physical memory address includes a physical address for memory on the host device;
storing the virtual to physical memory address translation map in a memory module on the memory controller;
receiving commands directly from an application running on the host device such that the commands bypass a driver and a kernel on the host device, wherein the commands include virtual memory addresses that refer to the memory on the host device; and
translating the virtual memory addresses to physical memory addresses using the virtual to physical memory address translation map.

9. The method of claim 8 wherein receiving the commands includes receiving the commands directly from the application running on the host device through one of a plurality of queues.

10. The method of claim 9 further comprising sharing the virtual to physical memory address translation map among the plurality of queues.

11. The method of claim 10 the commands include virtual memory addresses with an offset.

12. The method of claim 9 wherein:
receiving the virtual to physical memory address translation map from a host device includes receiving a plurality of virtual to physical memory address translation maps from the host device,
each of the virtual to physical memory address translation maps corresponds to one of the plurality of queues, and
the commands include virtual memory addresses with an offset.

13. The method of claim 9 wherein:
receiving the virtual to physical memory address translation map from a host device includes receiving a plurality of virtual to physical memory address translation maps from the host device,
the virtual to physical memory address translation maps are shared among the plurality of queues, and
the commands include virtual memory addresses with an offset.

14. A system comprising:
a host device configured to generate a virtual to physical memory address translation map, the host device including memory, a driver, a kernel and at least one application running on the host; and
a data storage device operationally coupled with the host device, the data storage device comprising:
a plurality of flash memory devices, each of the flash memory devices being arranged into a plurality of blocks having a plurality of pages for storing data; and
a memory controller operationally coupled with the flash memory devices, the memory controller being configured to:
receive the virtual to physical memory address translation map from the host device, wherein a physical memory address includes a physical address for the memory on the host device;
store the virtual to physical memory address translation map in a memory module on the memory controller;
receive commands directly from the at least one application running on the host device such that the commands bypass the driver and the kernel on the host device, wherein the commands include virtual memory addresses that refer to the memory on the host device; and
translate the virtual memory addresses to physical memory addresses using the virtual to physical memory address translation map.

15. The system of claim 14 wherein:
the host device includes a plurality of queues; and
the memory controller is configured to receive commands directly from the application running on the host device through one of the plurality of queues.

16. The system of claim 15 wherein the virtual to physical memory address translation map is shared among the plurality of queues.

17. The system of claim 16 wherein the commands include virtual memory addresses with an offset.

18. The system of claim 15 wherein:
the host device is configured to generate a plurality of virtual to physical memory address translation maps; and
the memory controller is configured to receive the plurality of virtual to physical memory address translation maps from the host device, wherein each of the virtual to physical memory address translation maps corresponds to one of the plurality of queues and the commands include virtual memory addresses with an offset.

19. The system of claim 15 wherein:
the host device is configured to generate a plurality of virtual to physical memory address translation maps; and
the memory controller is configured to receive the plurality of virtual to physical memory address translation maps from the host device, wherein the virtual to physical memory address translation maps are shared among the plurality of queues and the commands include virtual memory addresses with an offset.

20. The system of claim 14 wherein the memory module on the memory controller includes a dynamic random access memory (DRAM) and the memory controller includes a memory address translator, wherein the memory address translator is configured to translate the virtual memory addresses to physical memory addresses using the virtual to physical memory address translation map stored in the DRAM.

* * * * *